May 19, 1959
W. KLAMP
2,887,311
DOOR OPERATOR AND CONTROL THEREFOR
Filed April 4, 1957
2 Sheets-Sheet 1
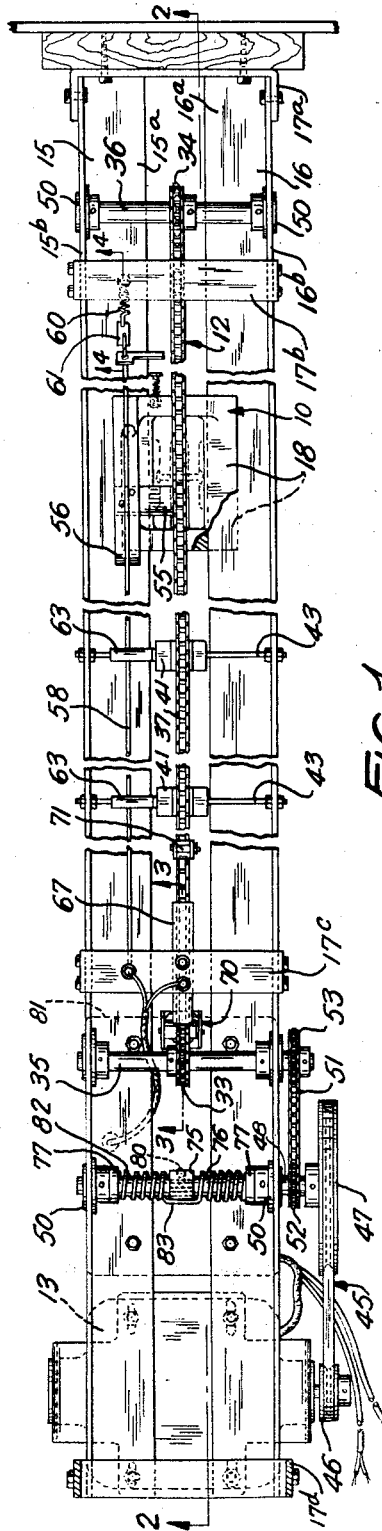
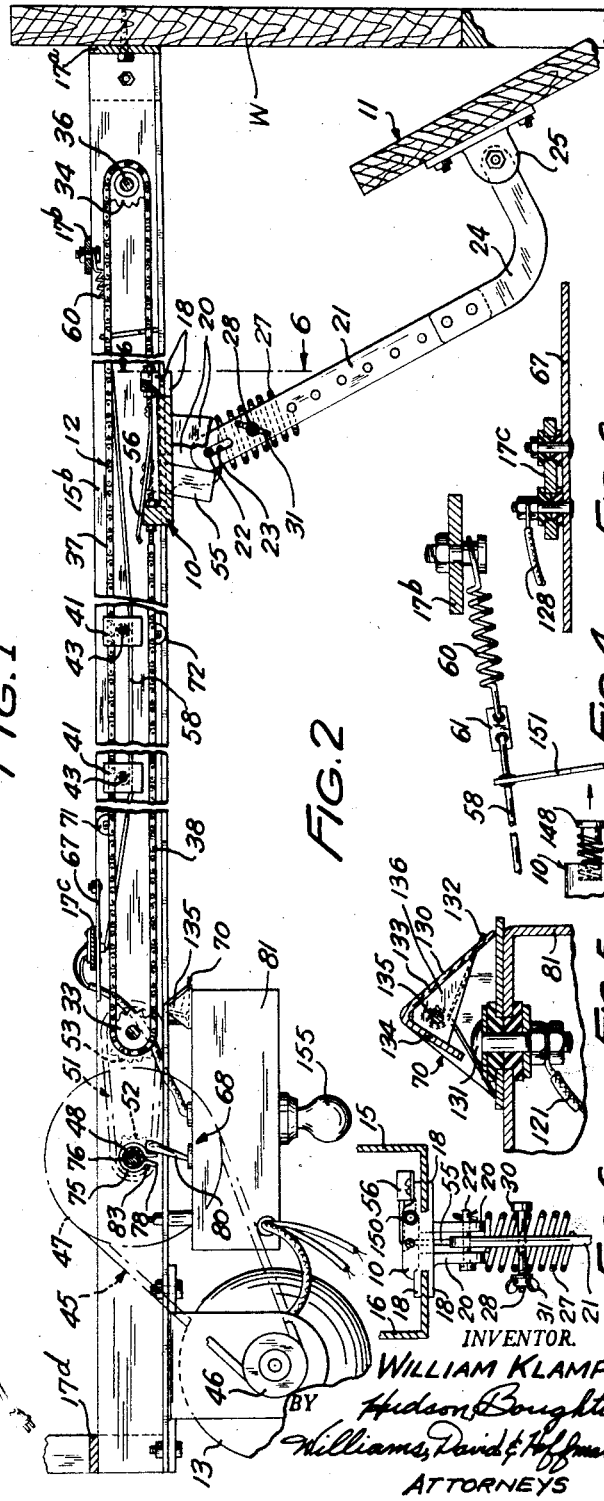
INVENTOR.
WILLIAM KLAMP
BY Hudson Boughton,
Williams, David & Hoffman
ATTORNEYS May 19, 1959 W. KLAMP 2,887,311
DOOR OPERATOR AND CONTROL THEREFOR
Filed April 4, 1957 2 Sheets-Sheet 2

INVENTOR.
WILLIAM KLAMP
BY Hudson Boughton,
Williams, David & Hoffmann
ATTORNEYS

United States Patent Office 2,887,311
Patented May 19, 1959

2,887,311

DOOR OPERATOR AND CONTROL THEREFOR

William Klamp, Rocky River, Ohio

Application April 4, 1957, Serial No. 650,663

29 Claims. (Cl. 268—59)

The present invention relates to door operators and particularly to the controls therefor.

Door operators generally comprise a motor which is connected to reciprocate a carriage to effect the opening and closing of a door connected to the carriage and are commonly constructed so that if a fault occurs in the control circuit which maintains a control relay for the motor continuously energized, the motor will be continuously energized and in many types of operators the motor will operate to repeatedly open and close the door operated thereby. When such a fault occurs, the usual limit and other control means are rendered ineffective to stop the motor.

Furthermore, the door operators of the prior art have not been constructed to operate satisfactorily when the door meets an obstruction during its closing movement. In the majority of operators the obstruction must exert sufficient force to effectively stall the motor before the motor will reverse or the construction is such that the motor merely stops rather than reverses. In still other operators the safety controls in the event of the door meeting an obstruction are not entirely satisfactory for various reasons, such as requiring the use of flexible electrical cable to the door, or failing to operate for all types of obstructions.

An important object of the present invention is to provide a new and improved door operating mechanism of the type referred to but in which the motor is not subject to continuous energization due to faults which would normally maintain the motor control relay in a condition whereby the motor is energized.

Another object of the present invention is to provide a new and improved door operating mechanism of the type referred to but which will not operate continuously or be continuously energized even though the relay coil of the motor control relay is maintained in an energized condition upon the actuation thereof to start the motor, by a fault which renders the door limit means ineffective to de-energize or actuate the relay to its motor "stop" position.

Yet another object is to provide a door operating mechanism of the type referred to in which a switch is actuated in relationship to the movement of the door operating carriage through its door operating cycle, the switch being effective to stop the motor in the presence of a fault that maintains the motor control relay in a condition where the motor is continuously energized.

Another object of the present invention is to provide a door operating mechanism of the type referred to in which the motor control circuit is conditioned immediately after the motor is started to effect operation in the reverse direction when the starting winding of the motor is next energized and in which means is provided for effecting energization of the starting winding to reverse the motor in response to the door striking an object in its closing movement, which means preferably comprises an uninsulated conductor extending along the path of movement of the door-operating carriage, the cable being grounded by a part moved in response to the door meeting an obstruction.

A further object of the present invention is the provision of a new and improved door operating mechanism in which a relay is alternately actuated to first and second positions to respectively start and stop the motor by successive momentary energizations thereof and in which a switch is actuated by the operating mechanism, preferably once during each cycle of door operation, to actuate the motor control relay from its immediate position to its other position if the relay is energized when the switch is operated.

A still further object of the present invention is to provide a door operating mechanism of the character set out above in which the motor is controlled by a relatively low voltage control circuit including a two-position ratchet type relay having motor-stop and motor-run positions and contacts which ground one side of the low voltage power supply when the relay is in its motor-run position and in which means is provided for momentarily connecting the relay coil across the power supply to actuate the relay and in which the motor is stopped at the limits of movement of the door by connecting one side of the relay to ground and continuous operation prevented in the event of a short circuit which maintains the relay energized on starting by momentarily short circuiting the relay, preferably once during each cycle of door operation, at a time the relay should, under normal operation, be de-energized.

The present invention also contemplates the provision of a new and improved simplified door operating mechanism in which the motor for driving the operator is reversed in response to the actuation of contacts which operate independently of motor speed when the door meets an obstruction, the mechanism being so constructed and arranged that it will have a long life and does not require a flexible electrical connection to the door in order that the mechanism will reverse in response to all types of small forces which oppose the closing of the door.

The present invention further contemplates a door operating mechanism as set out in the preceding paragraph in which the parts of the mechanism are not called upon to stall the motor when the door meets an obstruction, even though certain of the limit means and control elements are rendered ineffective.

Furthermore, it is an object of the present invention to provide a new and improved door operating mechanism in which the control circuit therefor is so constructed and arranged that the inertia of the door does not present a control problem and does not limit the maximum size of motor which can be used to drive the operator, the control circuit being such that it is not conditioned to reverse the motor on the next start until the inertia of the door has been overcome.

The invention resides in certain constructions and combinations and arrangements of parts and further objects and advantages thereof will be apparent from the following detailed description of the preferred embodiment made with reference to the accompanying drawings forming a part of this specification for all matter shown therein, whether or not expressly described, and in which:

Fig. 1 is a plan view of a door operating mechanism embodying the present invention;

Fig. 2 is a vertical sectional view taken approximately along line 2—2 of Fig. 1;

Fig. 3 is a fragmentary sectional view taken approximately along line 3—3 of Fig. 1;

Fig. 4 is a fragmentary detailed view showing the support for the safety cable used with the preferred and illustrated embodiments;

Fig. 5 is a sectional view through a safety switch embodied in the mechanism shown in Fig. 1;

Fig. 6 is a fragmentary sectional view taken approximately along line 6—6 of Fig. 2.

Figure 7:
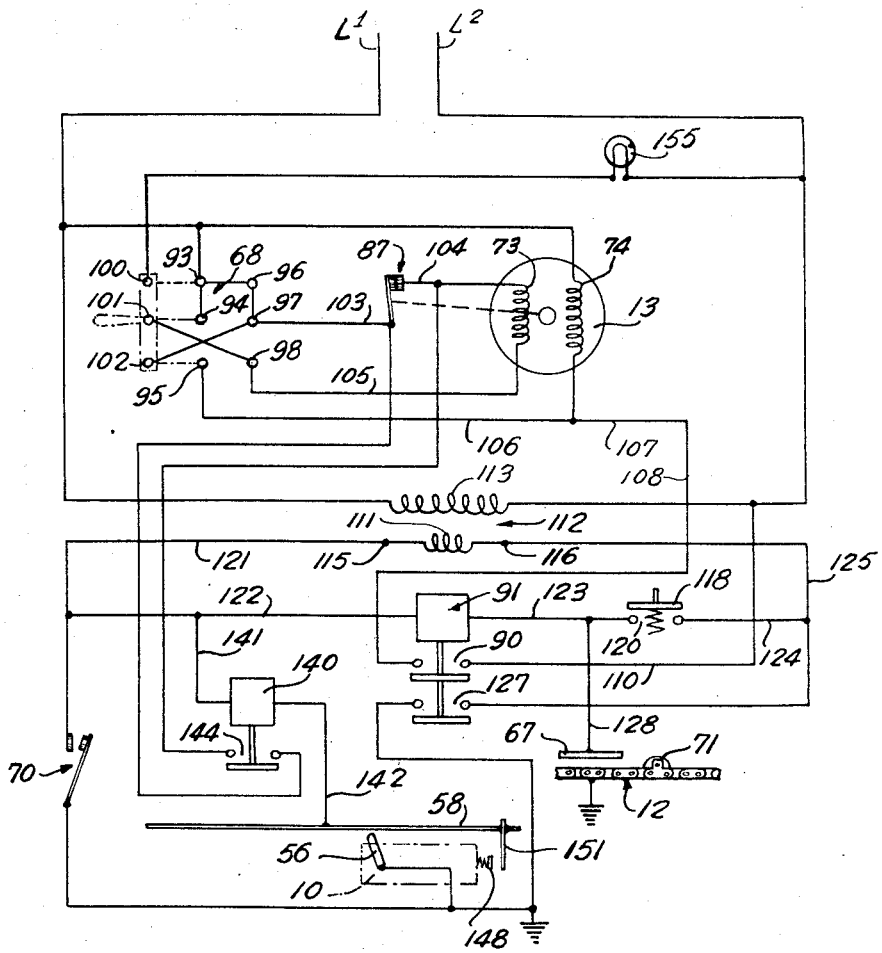
Fig. 7 is a simplified control circuit for the motor or the door operating mechanism.

The preferred embodiment of the present invention contemplates the provision of a door operating mechanism including switch means actuatable to operate the motor control relay to a stop condition if the relay is in an energized condition at the time the switch means is actuated, the switch means preferably being actuated once during each complete cycle of door operation and the motor control relay preferably being a ratchet relay which is momentarily short circuited by the actuation of the switch means to cause a pulsing of the relay and the actuation of the same to a stop position in the event that the relay is energized at the time of short circuiting. The broader aspects of the present invention contemplate the provision of safety means which is actuated in relationship to the door opening and closing cycle to stop the operation of the door in the event the control circuit, due to a fault therein, is in such a condition that the motor for driving the operator will remain continuously energized.

Furthermore, the present invention contemplates the provision of circuit means for reversing the door in response to an obstruction in its path during its closing movement, which circuit means is actuated independently of motor speed. It is also contemplated to provide a door operating mechanism where the control circuit for the motor is arranged in such a manner that the inertia of the door does not present a problem. In the preferred embodiment, the reversing circuit for the motor is not conditioned to operate the motor in the reverse direction on the next start until the motor has operated a sufficient time to overcome the effects of door inertia.

Referring to the drawings, the door operating mechanism shown therein comprises a carriage 10 connected to an overhead door or similar closure member 11 for closing an opening in a wall W and reciprocated to open and close the door by an endless flexible member or chain 12 driven by a motor 13, a reversible motor in the illustrated embodiment.

The carriage 10 is slidably supported for reciprocation between limits which correspond to fully open and fully closed positions of the door 11 by a pair of spaced angle members 15, 16 having horizontal flanges 15a, 16a and vertical flanges 15b, 16b. The angle members 15, 16 are disposed side by side with the carriage 10 therebetween and with the vertical flanges 15b, 16b extending upwardly from the remote side edges of the horizontal flanges 15a, 16a. The vertical flanges 15b, 16b are connected by straps 17a, 17b, 17c and 17d, which secure the angle members 15, 16 in spaced relationship. The straps 17a and 17d are also utilized to connect the operating mechanism to the wall W and to other supporting structure for the operating mechanism.

The carriage 10 is, in the illustrated embodiment, a cast body having a pair of spaced horizontal flanges 18 extending from each side thereof and forming a slidway which receives the horizontal flanges 15a, 16a to slidably support the carriage on the angle members 15, 16. The carriage 10 also has spaced depending vertical flanges 20 which are utilized to connect the carriage to the door 11. The carriage 10 is connected to the door 11 by a link 21 which has its upper end disposed between the flanges 20 and which is connected to the flanges 20 by a pin 22 supported by flanges and received in an elongated slot 23 in the upper end of the link 21. The elongated slot 23 permits relative movement of the link 21 with respect to the carriage 10. The lower end of the link 21, as the latter is viewed in Fig. 2, is connected to an arm 24 having its other end pivotally connected to a bracket 25 fixed to the door 11. The arm 24 is bent, in the illustrated embodiment, to define a right angle as is shown in Fig. 2. The door 11 is a conventional overhead door which is comprised of horizontal sections hinged together and which is guided for movement by guide channels disposed along the opposite side edges of the door and extending along the path of movement of the door. The door 11 and the guide channels therefor are not shown or described in detail since they do not, per se, form a part of this invention and since the details of their construction are well known to those skilled in the art.

The weight of the door 11 normally causes the link 21 to move to a position where the pin 22 engages the upper end of the elongated slot 23 as the latter is viewed in Fig. 2. In addition to the weight of the door 11 the link 21 is urged so that the pin 22 engages the upper end of the slot 23 therein by a spring 27 which encircles the link 21 adjacent the slot 23 and the one end of which abuts the lower ends of the flanges 20. The spring 27 is held compressed against the lower ends of the flanges 20 by a bolt 28 supported in an opening in the link 21 and extending through the coiled spring 27 between adjacent convolutions thereof and having a head 30 at one end which engages the outer sides of the convolutions and a wing nut 31 threaded onto the other end to engage the outer side of the convolutions at a point diametrically opposed to the point of engagement of the head 30. The loading due to the spring 27 may be adjusted by rotating the coil spring which will cause the helical convolutions of the spring to ride on the bolt 28 in the manner of a screw to increase or decrease the spring load depending upon the direction of rotation and the direction of lead of the helical convolutions. The slot 23 and the spring 27 cooperate to permit a relative movement to occur between the link 21 and the carriage 10 when the door meets an obstruction during its closing movement. This relative movement between the carriage 10 and the link 21 is used, as will be explained in detail hereinafter, to stop the movement of the carriage in a door closing direction.

The chain 12 for reciprocating the carriage 10 between its limits corresponding to the open and closed positions of the door 11 passes around spaced sprockets 33, 34 mounted on shafts 35, 36, respectively, journally supported by the vertical flanges 15b, 16b of the angle members 15, 16. The sprockets 33, 34 and the chain 12 are located in a vertical plane with the sprocket 34 being at the end of the channels 15, 16 adjacent the wall W.

The chain 12 has an upper run 37 and a lower run 38 to which the carriage 10 is connected. The upper run 37 of the carriage is additionally supported by cradles 41 carried by rods 43 extending between the vertical flanges 15b, 16b. The cradles 41 prevent sag of the upper run 37 of the chain 12. The chain 12 is driven to move the carriage 10 through its door opening and door closing movements by the motor 13 which is supported from the angle members 15, 16 at the end thereof remote from the wall W. The motor 13 is connected to drive the shaft 35 which mounts the sprocket 33 through a belt drive 45 having a driven pulley 46 mounted on the armature shaft of motor 13 and a driving pulley 47 fixed to an end of a shaft 48 extending between the vertical flanges 15b, 16b and extending outwardly of the latter and journally supported for rotation by bearing members 50 respectively mounted in the flanges 15b, 16b. The driving pulley of the belt drive 45 is fixed to the end portion of the shaft 48 that extends outwardly of the vertical flange 16b. The shaft 48 is, in turn, connected to drive the shaft 35 by a chain drive 51 including a sprocket 52 fixed to the shaft 48 and a sprocket 53 fixed to the end portion of shaft 35 which extends outwardly of the flange 16b. If the motor 13 is rotated in one direction the chain 12 is moved in one direction through its path to open or close the door and if the motor is rotated in the opposite direction the chain 12 is moved in the other direction through its path to actuate the door in its other direction.

As pointed out above, if the door during its closing movement meets an obstruction, the link 21 will move relative to the carriage 10 to effect the stopping of the door closing movement. In the illustrated embodiment, the upper end of the link 21 is in engagement with a lever 55 which is supported in a depending manner by a leaf spring 56 having one end thereof fixed to the upper side of the body of the carriage 10. The lever 55 extends downwardly from the leaf spring 56 through an opening in the body of the carriage to engage the link 21. Upon relative movement between the link 21 and the carriage 10 against the action of spring 27, the lever 55 will be moved upwardly to cause the free end of the leaf spring 56 to move upwardly into engagement with a conductive member or cable 58 extending along the path of movement of the carriage 10 adjacent the upper side of the carriage. The cable 58 is supported at its opposite ends by the straps 17b, 17c connecting the angle members 15, 16. The end of the cable 58 adjacent the wall W is connected to the strap 17b by a connection which comprises a spring 60 having one end connected to the strap 17b and its other end received in an opening in an insulator 61 which has another opening for receiving the right-hand end of cable 58. The insulator 61 insulates the cable from the strap 17b of the framework of the operating mechanism. The other, or left-hand end, of the cable 58, as the latter is viewed in the drawing, is connected to the strap 17c and is insulated therefrom. The spring 60 urges the cable against the underside of rods 43. The cable, however, is insulated from the rods by insulating sleeves 63, coaxially supported on the rods. In the preferred and illustrated embodiment the control circuit for the motor 13 is arranged so that when the leaf spring 56 is moved into engagement with the cable 58 the motor 13 will reverse its direction of operation to cause the door 11 to move in the opposite direction.

The control circuit for the motor 13 is shown schematically in Fig. 7 and includes, in addition to the safety cable 58, a limit bar 67, a reversing switch 68 and a safety switch 70. The limit bar 67 is supported from the strap 17c and is insulated therefrom.

When the carriage 10 is in its position corresponding to the fully closed position of the door 11 the limit bar 67 is engaged by a lug 71 on the upper run 37 of the chain 12 and when the carriage 10 is in its position corresponding to the fully open position of the door 11 the limit bar 67 is engaged by a lug 72. The lug 72 is normally on the lower run of the chain 12 but just prior to its engagement with the limit bar 67 moves around the sprocket 33 to engage the rearward, or left-hand end of the limit bar, as the latter is viewed in the drawings. Engagement of the limit bar 67 by either the lug 71 or the lug 72 grounds the bar and causes the motor 13 to stop.

The motor 13 is of the type in which the direction of motor rotation depends upon the phase relationship of the current in a start winding 73 of the motor with respect to the current in a main motor winding 74 and in the illustrated embodiment is a split phase motor. The start winding is cut out immediately after the motor reaches a predetermined speed. The reversing switch 68 of the control circuit controls the sense of the current in the start winding and is operated each time the motor is started to condition the motor energizing circuit so that upon the next energization of the start winding the motor will effect operation of the motor in the opposite direction. The throwing of the switch 68 each time the motor starts is accomplished by a switch actuating band 75 which encompasses a sleeve 76 of fibrous material on the shaft 48. The sleeve 76 has collars 77 at its opposite ends which respectively abut collars fixed to the shaft 48. The sleeve 76 will rotate with the shaft 48 by reason of the frictional engagement therewith, but if held will permit the shaft 48 to rotate relative thereto.

The switch actuating band 75 loosely encircles the sleeve 76 and has its opposite ends bent outwardly to form a radially extending tab 78 for engaging and actuating a switch operating member 80 for the reversing switch 68, the reversing switch 68 being disposed immediately below the shaft 48 in a control box 81 supported from the underside of the angle members 15, 16 and having housed therein the controls for the motor 13 and additionally mounting the safety switch 70. The switch actuating band 75 is caused to move with the sleeve 76 to actuate the reversing switch 68 by a spring 82 coiled on the sleeve 76 and having a straight portion 83 intermediate its ends which passes over the switch actuating band 75 and joins the portions of the spring disposed on the opposite sides of the band. The ends of the spring 82 abut the collars 77 and the frictional engagement of the spring with the sleeve 76 is such that the sleeve and spring will move as a unit. The straight portion 83 of the spring 82 is such that it can move relative to the arcuate portion of the band between the opposite sides of the tab 78. Assuming that the switch 68 is in the position shown in Fig. 2 with the switch operating member 80 being thrown to the right as viewed therein and with the tab 78 engaging the left-hand side of the member 80 and the straight portion 83 being in engagement with the left-hand side of tab 78 of the band, and if the motor is operating with the switch at the described position, the shaft 48 is rotating in a counterclockwise direction as viewed in Fig. 2, which tends to move the sleeve 76 and the spring thereon in a counterclockwise direction. Movement of the sleeve 76 and the spring 82 in a counterclockwise direction is prevented, however, by engagement of the straight portion 83 of the spring with the tab 78 which is, in turn, held against movement by the switch operating member 80 of the reversing switch 68. With the switch in the position referred to, the motor 13 will operate, the next time the start winding is energized, in a direction to move the shaft clockwise to drive the carriage 10 in the opposite direction. When the motor is next started it will be seen that clockwise movement of the shaft 48 will cause the sleeve 76 and the spring 82 to move clockwise with the shaft since the straight portion 83 of the spring is free to move in a clockwise direction away from the tab 78. After the shaft 48 has moved one revolution in the clockwise direction the straight portion 83 of the spring will engage the right-hand side of the tab 78 as the latter is viewed in Fig. 2 to cause the tab to move with the spring and sleeve 76. The tab 78 and the band 75 will move clockwise with the sleeve 76 away from engagement with the switch operating member 80 of the switch 68 until the tab 78 has completed approximately a full revolution and engages the other side of the switch actuating member 80. Continued clockwise rotation of the shaft 48 after re-engagement of the tab 78 and the member 80 will cause the tab 78 to throw the switch to its other or left-hand position as viewed in Fig. 2 to condition the motor energizing circuit to start the motor in the opposite direction the next time the start winding 73 is energized. It can now be seen that the sleeve 76, the switch actuating band 75, and the spring 82 function to throw the reversing switch 68 approximately two revolutions after the start of the motor 13. As is apparent from the following description, the throwing of reversing switch 68 conditions the motor 13 to start in the opposite direction the next time the start winding of the motor is energized.

Referring to the control circuit shown schematically in Fig. 7, the motor 13 includes a centrifugal switch 87, which is operated to an open position to de-energize the start winding 73 after the motor has come up to a predetermined speed. The motor 13 is designed to operate at the voltage of the available power supply which is, in the case of garage door operators, most commonly 110 volts. In the circuit of Fig. 7 conductors L1, L2 are the opposite sides of the power supply and the starting winding 73 of the motor is energized from the source by a circuit which includes the reversing switch 68 and normally open contacts 90 of a motor control relay 91 in addition to the centrifugal switch 87. The motor reversing switch 68 has three terminals 93, 94, 95 which are respectively connected to terminals 96, 97, 98 on the one hand if the switch operating lever 80 is thrown to one position and which are respectively connected to terminals 100, 101 and 102 on the other hand if the switch operating lever 80 is thrown to its other position. The terminal 97 is connected to one side of the start winding 73 by a wire 103 connected to one contact of the centrifugal switch 87 and a wire 104 connected to the other contact of switch 87 to the winding 73 while the terminal 98 is connected to the other side of the start winding 73 by a wire 105. The terminals 101, 102 are connected by bridging wires respectively to the terminals 97, 98 so that when the switch is in one position the terminal 94 is connected to the wire 103 and to one side of the starting winding 73 and when the switch is in the other position the terminal 94 is connected to the wire 105 and to the other side of the starting winding 73. The terminal 95 is, of course, connected to the other one of the wires 103, 105 depending upon the position of the switch. The terminal 94 is bridged to the terminal 93 which is, in turn, connected to L1.

The terminal 95 of the reversing switch is connected to L2 by a circuit including wire 106 connected to the terminal 95, wire 107, wire 108, the contacts 90 of relay 91 and wire 110 connected to L2. The main winding 74 of the motor 13 has one side connected to L1 and the other side connected to wire 106 which is, as above described, connected to L2 through the contacts 90 of ratchet relay 91.

The opening and closing of the contacts 90 of the relay 91 control the starting and stopping of the motor 13. When the contacts 90 are closed, current is supplied to the start winding 73 through the reversing switch 68 and the centrifugal switch 87 and to the main winding 74. The sense of the current flow in the start winding 73 which is determined by the position of reversing switch 68 determines the direction of rotation of the motor 13 and after the motor has started the centrifugal switch 87 opens to break the circuit to the start winding 73. The motor will continue to run as long as the contacts 90 remain closed. The relay 91 is of the type known as a ratchet relay or holding relay and when energized to close the contacts 90 the relay remains in its position with the contacts 90 closed when de-energized and until it is again energized. The subsequent energization of the relay causes it to operate to its position with the contacts 90 open and to remain in this position upon subsequent de-energization of the relay and until the relay is again energized. The relay 91 is a low voltage relay and is part of a low voltage control circuit energized from a secondary coil 111 of a step-down transformer 112 having a primary 113 connected across L1, L2. The opposite sides of the secondary coil 111 are connected to terminals 115, 116 respectively.

The relay 91 is energizable by the depression of a remote control push-button switch 118 which is spring biased so that the switch will return to its open position immediately upon release by the operator. The depression of the switch 118 closes its normally open contacts 120 to complete a circuit for energizing the relay 91 which may be traced from the terminal 115 through wire 121 connected to the terminal 115, wire 122, the relay coil of the relay 91, wire 123, contacts 120 of the push-button switch 118, wire 124, and wire 125 connected to the terminal 116.

The relay 91 has a second set of contacts 127 which are closed when the contacts 90 of the relay are closed. The closing of the contacts 127 completes a circuit for connecting the wire 125 and, in turn, the terminal 116 of the secondary coil 111 to ground. With the contacts 127 closed and the terminal 116 of the secondary coil 111 connected to ground the relay coil 91 is energized whenever the wire 123 is grounded. The wire 123 is connected to the limit bar 67 by a wire 128 and each time one of the lugs 71, 72 hits the bar, the latter and, in turn, the wire 123 are grounded to energize the relay 91, if the relay is de-energized, and to cause the latter to operate to its position where the contacts 90, 127 are open. As soon as the relay operates to open the contacts 127 the circuit between the terminal 116 and ground is broken and the relay 91 de-energized and, therefore, again energizable by the depression of the switch 118 to start the motor when desired. It will be noted that the motor 13 may also be stopped by depressing the push-button switch 118 which will cause the energization of the relay 91 to actuate the latter.

It is not uncommon in door operating mechanisms for a fault to occur which maintains the motor control relay 91 in an energized position once the latter has been energized to start the operation of the motor 13. It will be apparent from the control circuit that if the relay 91 is maintained in an energized condition after the motor 13 is started, the motor 13 will continue to run regardless of the operation of the lugs 71, 72 to ground the wire 123 since the grounding of the wire 123 would only complete a second circuit for energizing the already energized relay 91. In this condition the motor 13 would operate continuously and, in the illustrated operator, the door would repeatedly open and close, since the motor speed will reduce at the door open limit of the carriage to a point where the centrifugal switch 87 will close and the same will occur at the door closing limit or the cable 58 will be engaged by the leaf spring 56 to reverse the motor as is explained in detail hereinafter.

One feature of the present invention is the provision of the safety switch 70 which is actuated preferably once during each complete cycle of door operation, and will function to stop the motor 13 if the relay 91 is energized at the time the switch 70 is actuated. The safety switch 70 is connected between the terminal 115 of the secondary coil 111 and ground and when actuated completes a short circuit to ground around the operating coil of the relay 91. If the relay 91 is energized the short circuit completed by the safety switch 70 will effectively cause the de-energization of the relay and when the switch 70 is again opened the fault which maintains the relay 91 in an energized condition will again energize the relay and cause its actuation to its position where the contacts 90, 127 are open. If the fault does not cause the re-energization of the relay 91 for some reason or other, the lug 71 or the lug 72, whichever one next strikes the limit bar 67, will cause the energization of the relay 91 to stop the operation of the motor 13. The safety switch 70 is mounted on the box 81 adjacent the sprocket 33 and is actuated to a position grounding the wire 121 by the engagement of the lug 72 with a plate member 130 of the switch when the lug 72 is moving in a door opening direction. The lug 72 as it moves by the switch 70 will cause a plate member 130 to rotate about an axis into engagement with a contact 131 to ground the wire 121. After the lug 72 has passed the switch 70 the plate member 130 is returned to its position by a spring 132. The plate 130 is bent to provide angularly related portions 133, 134 with the included angle defined by the portions being an acute angle in the illustrated embodiment. The plate is supported for rotation about an axis parallel to the bend in the plate by trunnions 135 mounted on plates 136 bridging the ends of the portions 133, 134. The plate 130 is disposed adjacent the chain so that the portion 133 faces the wall W and is engaged by the lug 72 when the lug is moving in a door opening direction. The spring 132 biases the plate clockwise about its axis, as viewed in Figs. 2 and 5 and into engagement with the top of the box 81. When the lug 72 engages the plate 130 and rides thereover, the plate will rock in a counter-clockwise direction and the lower edge of the portion 134 will engage the contact 131 to ground the latter. The contact 131 is supported by the box 81 and is insulated therefrom. When the lug 72 rides over the plate 130 in a door closing direction, the switch will not be actuated, as is apparent from the construction thereof.

As hereinbefore stated, the direction of rotation of the motor 13 is determined by the direction of current flow through the start winding 73 when the motor is started. The motor may be reversed while running by causing current to flow in the start winding 73 in a direction which would normally cause the motor 13 to rotate in the opposite direction. The control circuit for the motor 13 is so arranged that whenever the leaf spring 56 engages the safety cable 58 current is supplied to the start winding 73 in a direction which causes the motor 13 to reverse. When the leaf spring 56 engages the cable 58 a circuit is completed to energize a relay 140 which may be traced from the terminal 115 to the terminal 116 of the secondary coil 111 through wire 121 connected to terminal 115, wire 122, wire 141, the relay coil of relay 140, wire 142 connected to the safety cable 58, leaf spring 56 connected to ground, and the now closed contacts 127 of ratchet relay 91 which are connected to ground and to the terminal 116 of secondary coil 111 through wire 125. The energization of relay 140 closes its normally open contacts 144. The contacts 144 are connected across the centrifugal switch 87 and complete a circuit from the terminal 97 through the wires 103, 104 to the start winding 73 to energize the latter. It will be remembered that the reversing switch is thrown a short time after the start of the motor 13 so that when the contacts 144 are closed the sense of the current supplied to the start winding 73 of the motor 13 is opposite to that which originally caused the motor to start and the motor will reverse.

The reversal of the motor in the manner described will be substantially instantaneous and coasting of the operator does not constitute a problem. This is important when the motor is being reversed because of an obstruction in the path of the door 11.

The delay in throwing the switch 68 to condition the circuit to reverse the motor upon the next energization of the phase or start winding 73 provides the motor time to overcome the inertia of the door 11. This is particularly important when the door is being closed from a fully open position. It will be appreciated by those skilled in the art, that when the motor has started to close the door, the inertia of the door will cause the spring 27 to compress and the carriage moved relative to the link 21. This would cause the leaf spring 56 to reverse the carriage or if the inertia of the door were sufficient, the motor would eventually slow to a speed where its centrifugal contacts close. In either case, if the starting circuit were conditioned to reverse the motor at its point, it would not be possible to close the door. In the illustrated circuit, however, the starting circuit is not conditioned to reverse the motor until the latter has operated a sufficient length of time to overcome the inertia of the motor.

A door operating mechanism constructed and controlled in accordance with the present invention is extremely sensitive to obstructions in the path of the door 11 and the door closing movement of the door 11 will cease when only a small force is applied to the door 11 to resist its door closing movement. The sensitivity of the control mechanism to an obstruction in the path of the door may be adjusted by adjusting the spring 27 which urges the link 21 in a direction to move the upper end of the slot 23 in the link against the pin 22. It can also be seen that if the relay coil 91 is maintained in an energized condition by a fault in the control circuit such as the grounding of wire 123, the safety switch 70 will operate to stop the operation of the motor 13.

In the preferred embodiment, the door operating mechanism is provided with means for effecting reversal of the motor 13 upon a predetermined movement or overtravel of the carriage 10 past its normal "door closed" position. In normal door operation, the door might be opened a small amount to permit a household pet to pass through the doorway and when the remote control switch is operated to close the door, the operator might hold the switch closed long enough to cause overtravel of the carriage since the limit bar 67 will be ineffective to stop the motor 13 if the relay 91 is not de-energized after starting the motor. This is a problem where the door operator is radio controlled since the relay in the transmitters holds in for a period of three seconds. If the illustrated door operator were radio controlled the receiver unit would maintain normally open contacts in parallel with the switch 118 in a closed condition for three seconds and would cause overtravel of the carriage. The overtravel of the carriage 10 will also occur if a fault occurs which keeps the relay 91 continuously energized in the manner described above.

The means for effecting reversal of the motor 13 on overtravel of the carriage 10 at the door closed position comprises a button 148 carried by a coil spring 150 secured to the forward end of the carriage 10 and engageable with a conductor member 151 suspended from and connected to the cable 58. If the carriage 10 overtravels its door closed position, the button 148 engages the member 151 to ground the cable 58 and reverse the motor in the manner described above. The button preferably does not engage the member 151 until the carriage has traveled a short distance past its normal door closed position. It will be noted that in the door closed position, the link 21 will be substantially vertical and therefore the leaf spring 56 is not to be relied upon to effect reversal of the motor under this condition. Without the button 148, the motor 13 would eventually stall on overtravel and when the speed thereof dropped to a point to close the centrifugal switch 87, the motor would reverse.

In the illustrated embodiment, the reversing switch 68 includes the terminal 100 which is connected to L1 when the switch 68 is in the position to which it is thrown by the tab 78 when the motor 13 is started in the direction necessary to open the door. A wire for energizing a lamp 155 is connected to the terminal 100 to cause energization of the lamp while the door is opening and until the motor is operated to move the door in a closing direction.

While in the preferred embodiment of the present invention the engagement of the leaf spring 56 with the cable 58 effects reversal of the motor, such engagement could merely stop the motor if the circuit were arranged so that the engagement of the spring 56 and cable 58 connected the wire 123 to ground.

It can now be seen that the objects heretofore enumerated and others have been accomplished and that a new and improved door operating mechanism has been provided wherein the operator is not subject to continuous operation upon the occurrence of a fault which maintains the motor control relay in an energized condition and which is so constructed and arranged that the door closing movement of the operator will cease when the door meets an obstruction which offers a resistance to the door closing movement.

While the preferred embodiment has been described in considerable detail, it is hereby my intention to cover all modifications and constructions and arrangements which fall within the ability of those skilled in the art and within the scope and spirit of the present invention.

Having thus described my invention, what I claim is:

1. In a door operating mechanism having a motor operable to reciprocate a carriage between limits to move a door connected to the carriage between its open and closed positions, a normally de-energized motor control relay having first and second positions and actuated from its immediate position to its other position by a momentary energization thereof, said relay being effective to energize said motor when in said first position and to de-energize said motor when in said second position and being normally de-energized during operation of said motor to move said carriage, a power supply, circuit means connecting said relay to said power supply and operable to effect momentary energization of the relay to actuate the same, and normally ineffective circuit means for preventing energization of said relay from said power supply, said circuit means including circuit make and break means operable to an actuated condition to render said circuit means effective and periodically operated to said actuated condition in relationship to the operation of said motor to move said carriage and at times when said relay is normally de-energized.

2. In a door operating mechanism having a motor operable to reciprocate a carriage between limits to move a door connected to the carriage between its open and closed positions, a normally de-energized motor control relay having first and second positions and actuated from its immediate position to its other position by a momentary energization thereof, said relay being effective to energize said motor when in said first position and to de-energize said motor when in said second position and being normally de-energized during operation of said motor to move said carriage, a power supply, circuit means connecting said relay to said power supply and operable to effect momentary energization of the relay to actuate the same, and normally ineffective circuit means for completing a short circuit across said relay to effectively prevent the energization thereof by said power supply and including circuit make and break means actuatable to an actuated condition to effect the short circuit and periodically operated to an actuated condition in relationship to the operation of said motor to move said carriage and when said relay is normally de-energized to effect the short circuit actuated in response to the operation of said motor and when said relay is normally de-energized to complete a short circuit around said coil to effectively prevent the energization thereof by said power supply.

3. In a door operating mechanism including a carriage connected to said door and reciprocable between limits to move the door to open and closed positions and a motor operatively connected to said carriage to reciprocate the latter, a control circuit for said motor including a relay having a first condition in which said motor is energized and a second condition in which said motor is de-energized, means for energizing said relay to actuate the latter to said first position, said relay being de-energized after actuation to said first condition, limit means for actuating said relay to said second condition upon movement of said carriage to either of its limits, and means actuated in relationship to the movement of said carriage between its limits and effective upon actuation to actuate said relay when the latter is energized and in said first condition.

4. In a door operating mechanism including a carriage connected to said door and reciprocable between limits to move the door between open and closed positions and a motor operatively connected to said carriage to reciprocate the latter, means for selectively starting said motor, limit means effective to de-energize said motor upon movement of said carriage to either of its limits, means actuated in relationship to the movement of said carriage between its limits and including normally ineffective circuit means for effecting de-energization of said motor and conditioned to be rendered effective upon the existence of a condition indicative of the failure of a limit means and including circuit make and break means periodically operated in relationship to the operation of said motor to move said carriage to render said circuit means effective when the latter is conditioned by the failure of a limit means, and safety means responsive to a predetermined force opposing the closing movement of the door to cease the operation of the motor in a door closing direction.

5. In a door operating mechanism as defined in claim 4 in which said safety means effects reversal of the motor and the movement of the door and the mechanism further comprising means responsive to a predetermined overtravel of said carriage past its door closed limit to effect the reversal of said motor.

6. In a door operating mechanism including a carriage connected to said door and reciprocable between limits to move the door between open and closed positions and a motor operatively connected to said carriage, means for selectively starting said motor, limit means for de-energizing said motor upon movement of said carriage to either of its limits, means actuated in relationship to the movement of said carriage between its limits and effective upon a condition indicative of the failure of said liimt means to de-energize said motor, and means responsive to a predetermined force opposing the closing movement of the door to effect operation of the motor to cease the door closing movement including an uninsulated conductor extending along the path of movement of said carriage and grounded in response to said predetermined force opposing the closing movement of the door.

7. In a door operating mechanism as defined in claim 6 in which the grounding of said conductor effects reversal of said motor and in which the mechanism further comprises means for grounding said conductor in response to a predetermined overtravel of said carriage past its door-closed limit position.

8. In a door operating mechanism including a carriage connected to said door and reciprocable between limits to move the door to open and closed positions and a motor operatively connected to said carriage to reciprocate the latter, a control circuit for said motor including a relay having a first condition in which said motor is energized and a second condition in which said motor is de-energized, means for energizing said relay to actuate the latter to said first position, said relay being de-energized after actuation to said first condition, limit means for actuating said relay to said second condition upon movement of said carriage to either of its limits, and means actuated in relationship to the movement of said carriage between its limits and effective upon actuation to de-energize said motor when said relay is energized and in said first condition, and means responsive to a predetermined force opposing the closing movement of the door to cease operation of the motor in a door closing direction.

9. In a door operating mechanism as defined in claim 8 wherein the last-mentioned means effects reversal of the motor and which mechanism further comprises switch means disposed to be actuated by said carriage when it overtravels its door-closed limit position for reversing said motor in response to the overtravel of said carriage past its door closed limit position.

10. In a door operating mechanism including a carriage connected to said door and reciprocable between limits to move the door between open and closed positions and a motor operatively connected to said carriage to reciprocate the latter, a control circuit for said motor including a relay having a first condition in which said motor is energized and a second condition in which said motor is de-energized, means for energizing said relay to actuate the latter to said first position, said relay being de-energized after actuation to said first condition, limit means for actuating said relay to said second condition upon movement of said carriage to either of its limits, means actuated in relationship to the movement of said carriage between its limits and effective upon actuation to actuate said relay when the latter is energized and in said first condition, and means responsive to a predetermined force opposing the closing movement of the door to cease operation of the motor to close the door including an uninsulated conductor extending along the path of movement of said carriage and grounded in response to the holding of said door.

11. In a door operating mechanism as defined in claim 10 in which the grounding of said conductor effects reversal of said motor and in which the mechanism further comprises means for grounding said conductor in response to a predetermined overtravel of said carriage past its door-closed limit position.

12. In a door operating mechanism having a carriage reciprocable between limits to move a door connected thereto between fully opened and closed positions and a motor operatively connected to drive said carriage, control means for said motor comprising a relay having first and second positions and alternately actuated between said positions by successive energizations thereof, said relay having an actuating coil for actuating the latter between said positions and first contacts effective to energize said motor when the relay is in said first position, a power supply for energizing said relay, means connecting one side of said actuating coil to one side of said power supply, switch means for selectively and momentarily connecting the other side of said coil to the other side of said power supply to energize the coil, and circuit means including limit means responsive to movement of said carriage to either of its limits for connecting the said other side of said coil to the said other side of said power supply, said relay including contacts conditioning said circuit means to energize said relay in response to said limit means when the relay is in said first position and rendering said circuit means effective to energize said relay when the latter is in its said second position.

13. In a door operating mechanism having a carriage reciprocable between limits to move a door connected thereto between fully opened and closed positions and a motor operatively connected to drive said carriage, control means for said motor comprising a relay having first and second positions and alternately actuated between said positions by successive energizations thereof, said relay having an actuating coil for actuating the latter between said positions and first contacts effective to energize said motor when the relay is in said first position, a power supply for energizing said relay, means connecting one side of said actuating coil to one side of said power supply, switch means for selectively and momentarily connecting the other side of said coil to the other side of said power supply to energize the coil, circuit means including limit means responsive to movement of said carriage to either of its limits for connecting the other side of said coil to the other side of said power supply, said relay including contacts conditioning said circuit means to energize said relay in response to said limit means when the relay in in said first position and rendering said circuit means ineffective to energize said relay when the latter is in its said second position, and switch means actuated in a predetermined relationship to and in response to the movement of said carriage, circuit means including said switch means for momentarily effecting the disconnection of said one side of said coil from said one side of said power supply upon the actuation of said switch means, said switch means being momentarily actuated when said carriage is not in a limit position.

14. In a door operating mechanism having a carriage reciprocable between limits to move a door connected thereto between fully opened and closed positions and a motor operatively connected to drive said carriage, control means for said motor comprising a relay having first and second positions and alternately actuated between said positions by successive energizations thereof, said relay having an actuating coil for actuating the latter between said positions and first contacts effective to energize and de-energize said motor when said relay is in said first and second positions respectively, a power supply for energizing said relay, means connecting one side of said actuating coil to one side of said power supply, switch means for selectively and momentarily connecting the other side of said coil to the other side of said power supply to energize the coil, said relay having second contacts which are closed when said relay is in said first position to connect the other side of said power supply to a ground, limit means responsive to movement of said carriage to either of its limits to connect the other side of said coil to ground, switch means actuated in a predetermined relationship to and in response to the movement of said carriage, circuit means including said switch means for momentarily connecting said one side of said power supply to ground and completed by the actuation of said switch means, said switch means being momentarily actuated when said carriage is not in a limit position.

15. In a door operating mechanism having a carriage reciprocable between limits to move a door connected thereto between fully opened and closed positions and a motor operatively connected to drive said carriage, control means for said motor comprising a relay having first and second positions and alternately actuated between said positions by successive energizations thereof, said relay having an actuating coil for actuating the relay between said positions and contacts effective to energize and de-energize said motor when said relay is in said first and second positions respectively, a power supply for energizing said relay, means connecting one side of said relay actuating coil to one side of said power supply, switch means for selectively and momentarily connecting the other side of said coil to the other side of said power supply to energize the coil, circuit means including limit means responsive to movement of said carriage to either of its limits to connect said other side of said coil to the said other side of said power supply, said relay having second contacts effective to break said circuit means when said relay is in said second position and to condition said circuit means to render said limit means effective when said relay is in said first position, and motor reversing means including a reversing relay energizable to effect reversal of the motor, said reversing relay including an actuating coil having one side connected to said one side of said power supply, and means responsive to an obstruction in the path of said door to connect the other side of the coil to the other side of said power supply when the first said relay is in said first position.

16. In a door operating mechanism having a carriage reciprocable between limits to move a door connected thereto between fully opened and closed positions and a motor operatively connected to drive said carriage, control means for said motor comprising a relay having first and second positions and alternately actuated between said positions by successive energizations thereof, said relay having an actuating coil for actuating the relay between said positions and contacts effective to energize and de-energize said motor when said relay is in said first and second positions respectively, a power supply for energizing said relay, means connecting one side of said relay actuating coil to one side of said power supply, switch means for selectively and momentarily connecting the other side of said coil to the other side of said power supply to energize the coil, circuit means including limit means responsive to movement of said carriage to either of its limits to connect said other side of said coil to the said other side of said power supply, said relay having second contacts effective to break said circuit means when said relay is in said second position and to condition said circuit means to render said limit means effective when said relay is in said first position, and motor reversing means including a reversing relay energizable to effect reversal of the motor, said reversing relay including an actuating coil having one side connected to said one side of said power supply, means responsive to an obstruction in the path of said door to connect the other side of the coil to the other side of said power supply when the first-said relay is in said first position, and means for connecting said other side of said coil to ground upon overtravel of the door-closed limit position of said carriage.

17. In a door operating mechanism having a carriage reciprocable between limits to move a door connected thereto between fully opened and closed positions and a motor operatively connected to drive said carriage, control means for said motor comprising a relay having first and second positions and alternately actuated between said positions by successive energizations thereof, said relay having an actuating coil for actuating the latter between said positions, a power supply for energizing said relay, means connecting one side of said relay actuating coil to one side of said power supply, switch means for selectively and momentarily connecting the other side of said coil to the other side of said power supply to energize the coil, said relay having contacts which are closed when said relay is in said first position to connect the other side of said power supply to a ground, limit means responsive to movement of said carriage to either of its limits to connect the other side of said coil to ground, motor reversing means including a reversing relay energizable to effect reversal of the motor, said reversing relay including an actuating coil having one side connected to said one side of said power supply, and means responsive to an obstruction in the path of said door to connect the other side of the coil of said reversing relay to ground, the last said means including an uninsulated conductor extending along a path of movement of said carriage and grounded in response to the door striking an obstruction during its closing movement.

18. In a door operating mechanism having a carriage reciprocable between limits to move a door connected thereto between fully opened and closed positions and a motor operatively connected to drive said carriage, control means for said motor comprising a relay having first and second positions and alternately actuated between said positions by successive energization thereof, said relay having an actuating coil for actuating the latter between said positions and first contacts effective to energize and de-energize said motor when said relay is in said first and second positions respectively, a power supply for energizing said relay, means connecting one side of said actuating coil to one side of said power supply, switch means for selectively and momentarily connecting the other side of said coil to the other side of said power supply to energize the latter, said relay having second contacts which are closed when said relay is in first position to connect the other side of said power supply to a ground, limit means responsive to movement of said carriage to either of its limits to connect the other side of said coil to ground, switch means actuated in a predetermined relationship to and in response to the movement of said carriage to momentarily connect said one side of said power supply to ground, said switch means being actuated when said carriage is not in a limit position, motor reversing means including a reversing relay energizable to effect reversal of the motor, said reversing relay including an actuating coil having one side connected to said one side of said power supply, and means responsive to an obstruction in the path of said door to connect the other side of the coil of said reversing relay to ground, the last said means including an uninsulated conductor extending along a path of movement of said carriage and grounded in response to the door striking an obstruction during its closing movement.

19. In a door operating mechanism having a carriage reciprocable between limits to move a door connected thereto between fully opened and closed positions and a motor operatively connected to drive said carriage, control means for said motor comprising a relay having first and second positions and alternately actuated between said positions by successive energizations thereof, said relay having an actuating coil for actuating the latter between said positions and said control means operating to effect reversal of said carriage when the latter reaches its limits and the relay for the motor is maintained in a condition which maintains said motor energized, a power supply for energizing said relay, means connecting one side of said relay actuating coil to one side of said power supply, switch means for selectively and momentarily connecting the other side of said coil to the other side of said power supply to energize the latter, said relay having contacts which are closed when said relay is in said first position to connect the other side of said power supply to a ground, limit means responsive to movement of said carriage to either of its limits to connect the other side of said coil to ground, switch means actuated in a predetermined relationship to and in response to the movement of said carriage to momentarily connect said one side of said power supply to ground, said switch means being actuated when said carriage is not in a limit position, motor reversing means including a reversing relay energizable to effect reversal of the motor, said reversing relay including an actuating coil having one side connected to said one side of said power supply, means responsive to an obstruction in the path of said door to connect the other side of the coil of said reversing relay to ground, the last said means including an uninsulated conductor extending along a path of movement of said carriage and grounded in response to the door striking an obstruction during its closing movement.

20. In a door operating mechanism, a carriage operatively connected to a door and reciprocable between limits to move the door between open and closed positions, a reversible motor operable in opposite directions to move the carriage through its door opening and door closing strokes respectively, said motor including a first winding and a second winding with the phase relationship between the currents in said windings determining the direction of rotation of said motor, a circuit for energizing said first winding including a reversing switch actuatable between first and second positions to reverse the phase of the current in said first winding with respect to the current in said second winding and a centrifugal switch responsive to the speed of said motor to open the circuit to the first winding, means responsive to the rotation of said motor to actuate said reversing switch from its immediate position to its other position immediately after each start of the motor, normally ineffective circuit means for completing a circuit across said switch to energize said first winding including means responsive to a predetermined condition during door operation to complete the circuit across said centrifugal switch to energize said first winding.

21. In a control system for a door operator including a reversible motor having a winding for effecting operation of the motor in a direction dependent on the phase of the current therein and normally de-energized after the start of said motor and operatively connected to reciprocate a carriage to open and close a door connected to the carriage, said control system including means for effecting reversal of the phase of current to said motor on each successive motor start which means comprises contacts which open during the operation of the motor to de-energize the winding and which when closed permit the energization of motor control circuit to be effective to energize said winding, the improvement which comprises normally ineffective circuit means for completing a circuit about said contacts to energize said winding, said normally ineffective circuit means including means operated to render said normally ineffective circuit means effective to energize said winding in response to a condition of said door operator indicative of the fact that the door is to be reversed.

22. In a door operating mechanism, a carriage operatively connected to a door and reciprocable between limits to move the door between open and closed positions, a reversible motor operable in opposite directions to move the carriage through its door opening and door closing strokes respectively, said motor including a first winding and a second winding with the phase relationship between the currents in said windings determining the direction of rotation of said motor, a circuit for energizing said first winding including a reversing switch actuatable between first and second positions to reverse the phase of the current in said first winding with respect to the current in said second winding and a centrifugal switch responsive to the speed of said motor to open the circuit to the first winding, means responsive to the rotation of said motor to actuate said reversing switch from its immediate position to its other position immediately after each start of the motor, and means responsive to a predetermined force opposing the closing of the door to complete a circuit across said centrifugal switch to energize said first winding, including an uninsulated conductor extending along the path of movement of said carriage and grounded when said predetermined force is applied to said door during its closing movement.

23. In a door operating mechanism, a carriage operatively connected to a door and reciprocable between limits to move the door between open and closed positions, a reversible motor operable in opposite directions to move the carriage through its door opening and door closing strokes respectively, said motor including a first winding and a second winding with the phase relationship between the currents in said windings determining the direction of rotation of said motor, a circuit for energizing said first winding including a reversing switch actuatable between first and second positions to reverse the phase of the current in said first winding with respect to the current in said second winding and a centrifugal switch responsive to the speed of said motor to open the circuit to the first winding, means responsive to the rotation of said motor to actuate said reversing switch from its immediate position to its other position immediately after each start of the motor, and means responsive to a predetermined force opposing the closing of the door to complete a circuit across said centrifugal switch to energize said first winding, circuit means for starting and stopping said motor comprising a power supply, a ratchet relay having first and second positions and first contacts operative to effect the energization and de-energization of said windings when said relay is in said first and second positions respectively, said circuit means including first switch means for momentarily connecting said relay across said power supply, and limit means actuated upon movement of said carriage to a limit position and effective to connect said relay across said power supply when the relay is in its said first position.

24. In a door operating mechanism, a carriage operatively connected to a door and reciprocable between limits to move the door between open and closed positions, a reversible motor operable in opposite directions to move the carriage through its door opening and door closing strokes respectively, said motor including a first winding and a second winding with the phase relationship between the currents in said windings determining the direction of rotation of said motor, a circuit for energizing said first winding including a reversing switch actuatable between first and second positions to reverse the phase of the current in said first winding with respect to the current in said second winding and a centrifugal switch responsive to the speed of said motor to open the circuit to the first winding, means responsive to the rotation of said motor to actuate said reversing switch from its immediate position to its other position immediately after each start of the motor, and means responsive to a predetermined force opposing the closing of the door to complete a circuit across said centrifugal switch to energize said first winding, circuit means for starting and stopping said motor comprising a power supply, a ratchet relay having first and second positions and first contacts operative to effect the energization and de-energization of said windings when said relay is in said first and second positions respectively, said circuit means including first switch means for momentarily connecting said relay across said power supply, limit means actuated upon movement of said carriage to a limit position and effective to connect said relay across said power supply when the relay is in its said first position, and switch means actuated in response to the movement of said carriage when the latter is not in a limit position and effective to prevent energization of said relay from said power supply.

25. In a control system for a reversible motor as defined in claim 21 wherein said means actuated in response to a condition indicative of the fact that the door is to be reversed comprises circuit make and break means which is closed in response to the door closing movement being opposed by a predetermined force.

26. In a door operating mechanism wherein a motor is operatively connected to a door to move the latter between open and closed positions and a control system for the motor includes means for selectively starting the motor, limit means for stopping the operation of the motor when the door is at its open and closed positions respectively, and means for reversing the direction of operation of the motor, said control system operating to effect a reversal of the motor and the direction of movement of the door at each of the limit positions of the door upon failure of said limit means, the improvement which comprises normally ineffective circuit means for stopping said motor and conditioned to be effective to stop said motor in response to a condition indicative of the failure of said limit means, said circuit means including switch means actuated in relationship to the movement of said door between its positions and rendering when actuated said normally ineffective circuit means effective to stop the motor when said circuit means is conditioned by a failure of said limit means.

27. In a door operating mechanism, having a motor operatively connected to operate a door, a motor control system including a motor control relay having first and second positions and being actuatable from its immediate position to its other position by a momentary energization thereof and holding in the position to which it is actuated by the said momentary energization, said relay having contacts effective to energize said motor when said relay is in said first position and to deenergize said motor when said relay is in said second position, first circuit means for selectively effecting momentary energization of said relay to actuate the latter to its said first position to energize the motor, and second circuit means responsive to door movement to energize said relay to actuate the latter from its said first position to its said second position, said second circuit means including contacts operated in response to the movement of said relay to said first position to condition said second circuit means to energize said relay in response to door movement and to movement of said relay to its said second position to render the said second circuit means ineffective to energize said relay.

28. In a door operating mechanism having a motor operatively connected to a door to operate the latter between its open and closed positions, a holding relay having a first position in which said motor is energized and a second position in which said motor is de-energized, first circuit means for selectively and momentarily energizing said relay to actuate the latter to its said first position to energize the motor, second circuit means responsive to the movement of said door to a limit position for energizing said relay to actuate the latter to its said second position to de-energize said motor including contacts operated in response to the actuation of said relay to said second position to render said second circuit means ineffective to energize said relay and in response to the actuation of said relay to its said first position to condition said second circuit means to be effective when said door moves to a limit position.

29. The method of reversing the direction of operation of a motor-driven operator for a door in which a driving motor for the operator has a starting winding energizable to effect rotation of the motor in different directions depending upon the phase of energization of the starting winding and in which the connections of a circuit for energizing the starting winding are reversed after each start of the motor to cause operation of the motor in a reverse direction on the next energization of the starting winding and wherein a centrifugal switch driven from the motor opens the circuit for energizing the starting winding when the motor is running, the step which comprises reversing the direction of motor operation when the door meets an obstruction in its closing movement by energizing the starting winding in a direction to reverse the motor while the motor is running substantially at its operating speed.

References Cited in the file of this patent

UNITED STATES PATENTS

| | | |
|---|---|---|
| 2,253,170 | Dunham | Aug. 19, 1941 |
| 2,568,808 | Johanson | Sept. 25, 1951 |
| 2,752,150 | Richmond et al. | June 26, 1956 |

UNITED STATES PATENT OFFICE

CERTIFICATE OF CORRECTION

Patent No. 2,887,311 May 19, 1959

William Klamp

It is hereby certified that error appears in the printed specification of the above numbered patent requiring correction and that the said Letters Patent should read as corrected below.

Column 13, line 37, for "means effective" read -- means ineffective --; line 60, for "relay in in said" read -- relay is in said --.

Signed and sealed this 29th day of September 1959.

(SEAL)
Attest:

KARL H. AXLINE
Attesting Officer

ROBERT C. WATSON
Commissioner of Patents